United States Patent [19]

Yamazaki

[11] Patent Number: 5,018,845
[45] Date of Patent: May 28, 1991

[54] PHOTOGRAPHIC SYSTEM FOR STABILIZING AN IMAGE INCLUDING TWO POSITIVE LENS GROUPS, EACH GROUP INCLUDING A POSITIVE LENS AND A NEGATIVE LENS

[75] Inventor: Shoichi Yamazaki, Yokohama, Japan

[73] Assignee: Canon Kabushiki Kaisha, Tokyo, Japan

[21] Appl. No.: 487,193

[22] Filed: Mar. 1, 1990

[30] Foreign Application Priority Data

Mar. 2, 1989 [JP] Japan ................................. 1-50363

[51] Int. Cl.$^5$ ............................................. G02B 27/64
[52] U.S. Cl. ..................................................... 350/500
[58] Field of Search ......................................... 350/500

[56] References Cited

U.S. PATENT DOCUMENTS 4,844,602 7/1989 Kitagishi et al. ..................... 350/500
4,907,868 3/1990 Kitagishi et al. ..................... 350/500

*Primary Examiner*—Jon W. Henry
*Attorney, Agent, or Firm*—Fitzpatrick, Cella, Harper & Scinto

[57] ABSTRACT

A device for stabilizing an image includes first and second lens groups having a positive refractive power. The second lens group is disposed on an image surface side of the first lens group. Both the first and second lens groups contain at least one positive lens and at least one negative lens, and determines a reference optical axis. The device satisfies the following condition:

$$1 < f1/F < 3.5$$

where f1 is a focal length of the first lens group, and F is a focal length of the overall system. The device stabilizes an image by decentering the second lens group in a direction having a component perpendicular to the reference optical axis.

5 Claims, 6 Drawing Sheets

PHOTOGRAPHIC SYSTEM FOR STABILIZING AN IMAGE INCLUDING TWO POSITIVE LENS GROUPS, EACH GROUP INCLUDING A POSITIVE LENS AND A NEGATIVE LENS

BACKGROUND OF THE INVENTION

1. Field of the Invention

The present invention relates to a photographic system having the function of correcting blurring of an image caused by vibrations or the like, i.e., commonly called the vibration-proof function. More particularly, the present invention pertains to an image stabilizing device for use in a photographic system which enables the size and weight of a blurring correcting movable lens group to be reduced. This, in time, prevents a reduction in the optical performance of the photographic system, which would occur when the movable lens group is moved in, for example, a direction perpendicular to an optical axis to correct blurring. An improved controllability of an actuator also is assured.

2. Description of the Related Art

When pictures are taken on a moving object, such as a running vehicle or an airplane, vibrations of the moving object are transmitted to a photographic system, causing images to be blurred. The degree of blurring occurring in the images also will increase, for example, when the focal length of the photographic system increases.

The present applicant has already proposed photographic systems having the vibration-proof function for preventing blurring of an image in, for example, Japanese Patent Laid-Open Nos. 133119/1988, 229425/1988, and 201623/1988.

In such photographic systems, if the optical axis of a camera lens system, for example, deviates due to vibrations occurring in the camera, the deviation of images caused by the deviation of the lens system will be calculated by an acceleration sensor or the like incorporated in the camera. On the basis of the output of the acceleration sensor, part of the lens groups of the photographic system which is disposed closest to an image surface is decentered in, for example, a direction perpendicular to the optical axis, i.e., the decentering is in a direction so that deviation of the image will be cancelled.

This decentering operation provides for excellent still images.

FIGS. 7 (A), (B) and (C) show the essential parts of a prior art photographic system with a vibration-proof function, such as is disclosed by Japanese Patent Laid-Open No. 201623/1988. The photographic system contains an afocal lens group 41, which is composed of a converging lens sub-group 41a and a diverging lens sub-group 41b, and a converging movable lens group 42.

FIG. 7 (A) shows a normal state, and FIG. 7 (B) shows a state in which an image on the optical axis is deviated from a center 46 of an image surface 45 due to vibrations or the like.

Blurring of the image is corrected and a still image is thereby obtained by decentering the movable lens group 42 in, for example, a direction perpendicular to the optical axis by means of an actuator 43 which is operated on the basis of an output signal from an acceleration sensor 44, as shown in FIG. 7 (C).

In a mechanism for eliminating blurring of an image by vibrating part of the lens group in a photographic system so as to provide still images, a blurring correcting movable lens group generally must contain a lesser number of lenses and be, therefore, small and lightweight. Furthermore, the degree of aberration generated by decentering the movable lens in, for example, the direction perpendicular to the optical axis must be low. Hence, a degree of reduction in the optical performance must be low. Also, the structure of the blur eliminating mechanism must be simple.

However, it normally is very difficult to provide a photographic system that satisfies all of the aforementioned conditions. In particular, decentering of the lens group which provides part of the refractive power of the photographic system will reduce the optical performance of the photographic system greatly, making it impossible to obtain excellent images. Related applications include the commonly-owned, copending U.S. application Ser. Nos. 07/261,231, and 07/417,429.

SUMMARY OF THE INVENTION

A primary object of the present invention is to provide a photographic system having a vibration-proof function in which part of the lens groups thereof, a movable lens group, is moved in a direction having a component in a the direction perpendicular to a reference optical axis, so as to correct blurring of an image. This photographic system enables the number of lenses in the movable lens group to be decreased, and permits simple movable lens group structure.

A second object of the present invention is to provide a photographic system having a vibration-proof function wherein the degree of various aberrations generated by parallel-decentering the movable lens group is reduced, so as to provide an excellent optical performance.

To this end, the present invention comprises a first lens group having a positive refractive power, and a second lens group having a positive refractive power. The second lens group is disposed on an image side of the first lens group. Both the first and second lens groups respectively have at least one positive lens and one negative lens. The image stabilizing apparatus satisfies the following condition:

$$1 < f1/F < 3.5$$

where f1 is a focal length of the first lens group, and F is a focal length of the overall system. An image is stabilized by deflecting the second lens group in a direction having a component of the direction perpendicular to an optical axis.

DETAILED DESCRIPTION OF THE PREFERRED EMBODIMENTS

Figure 1:
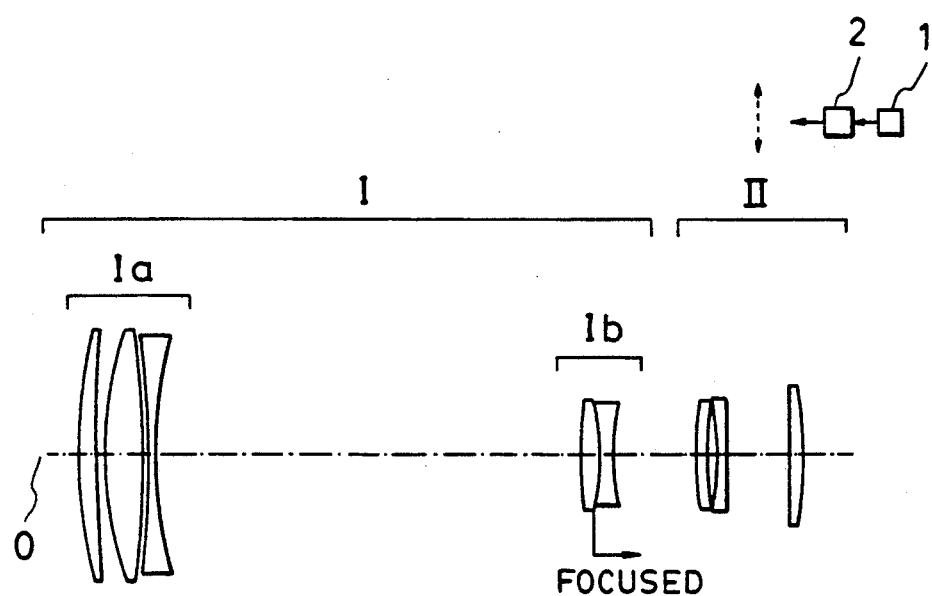
FIGS. 1 and 4 are cross-sectional views of Numerical Examples 1 and 2 of a lens system according to an embodiment of the present invention.
Figure 2:
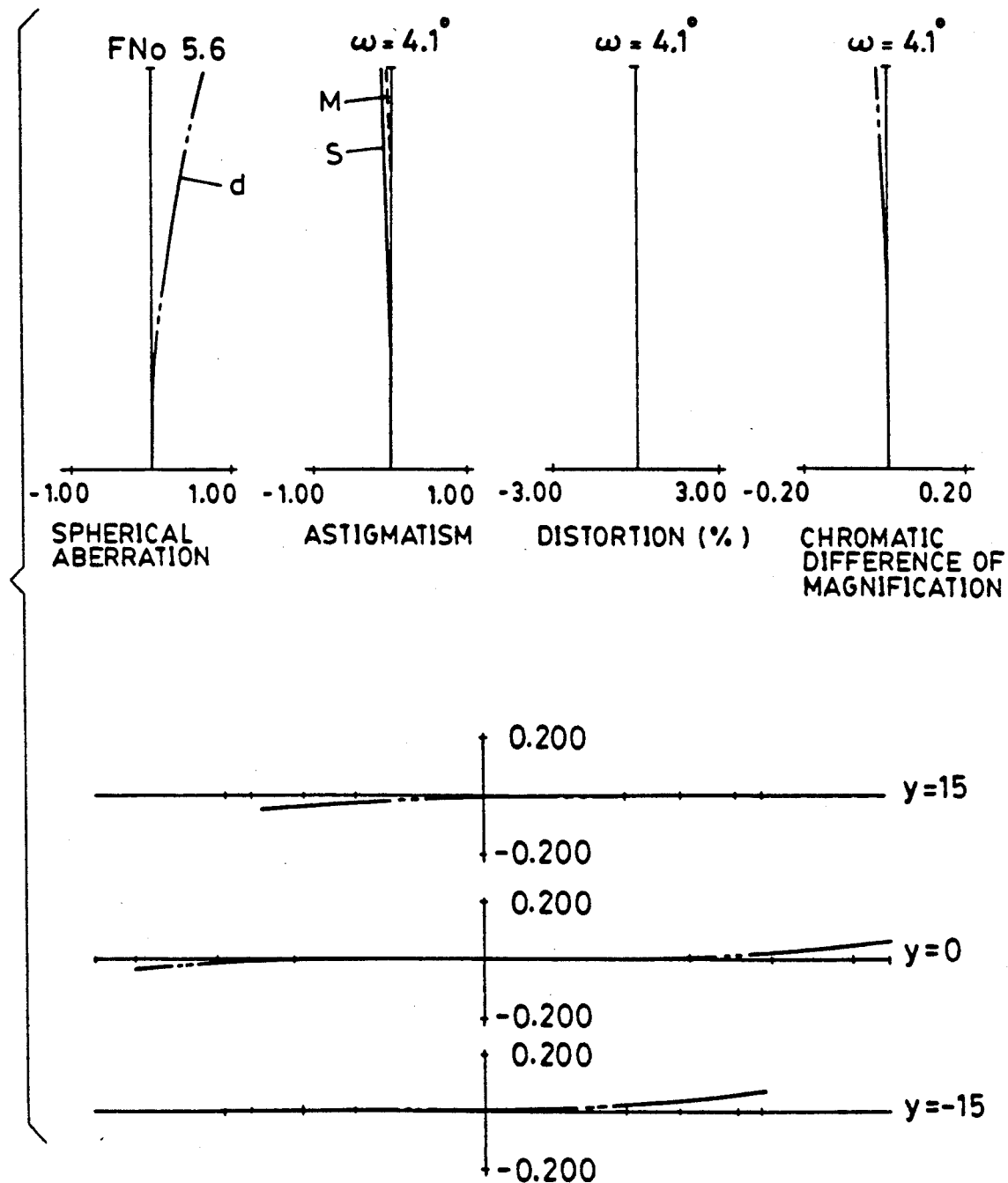
FIGS. 2 and 5 show aberration curves which are obtained in the Numerical Examples 1 and 2 of the present invention.
Figure 3:
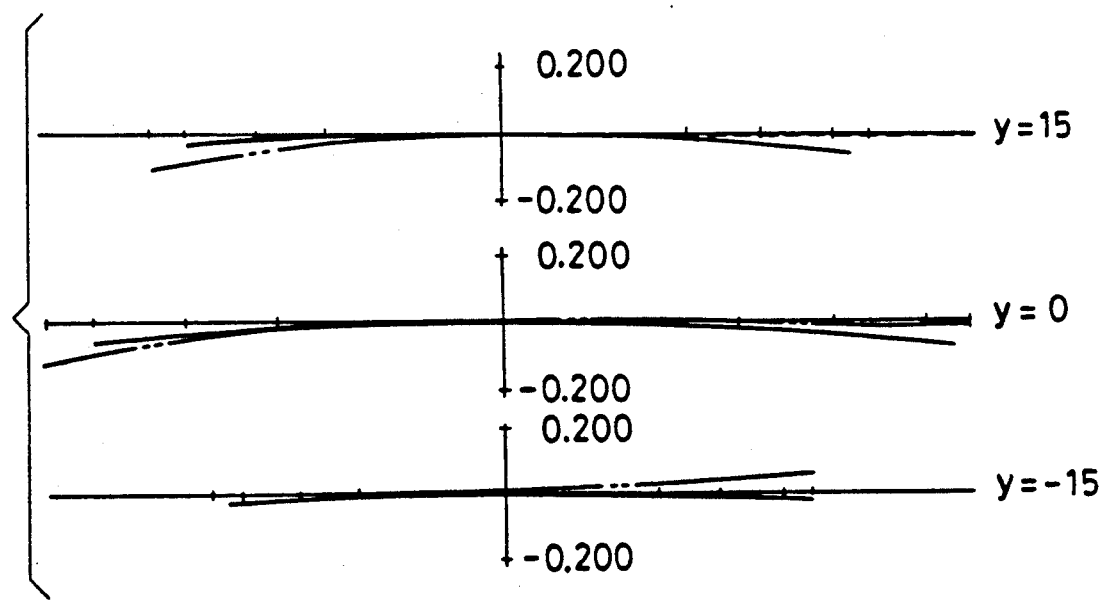
FIG. 3 shows lateral aberration curves which are obtained in the embodiment of the present invention when a second lens group is moved so as to correct an image blurring of 0.5 mm on an image surface.
Figure 4:
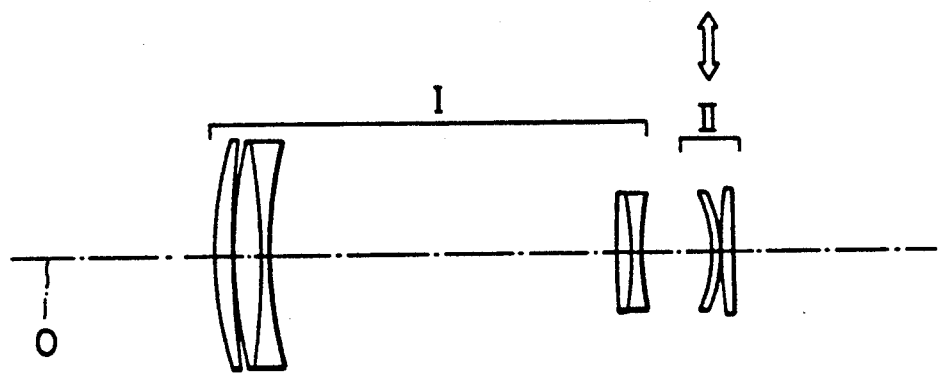
Figure 6:
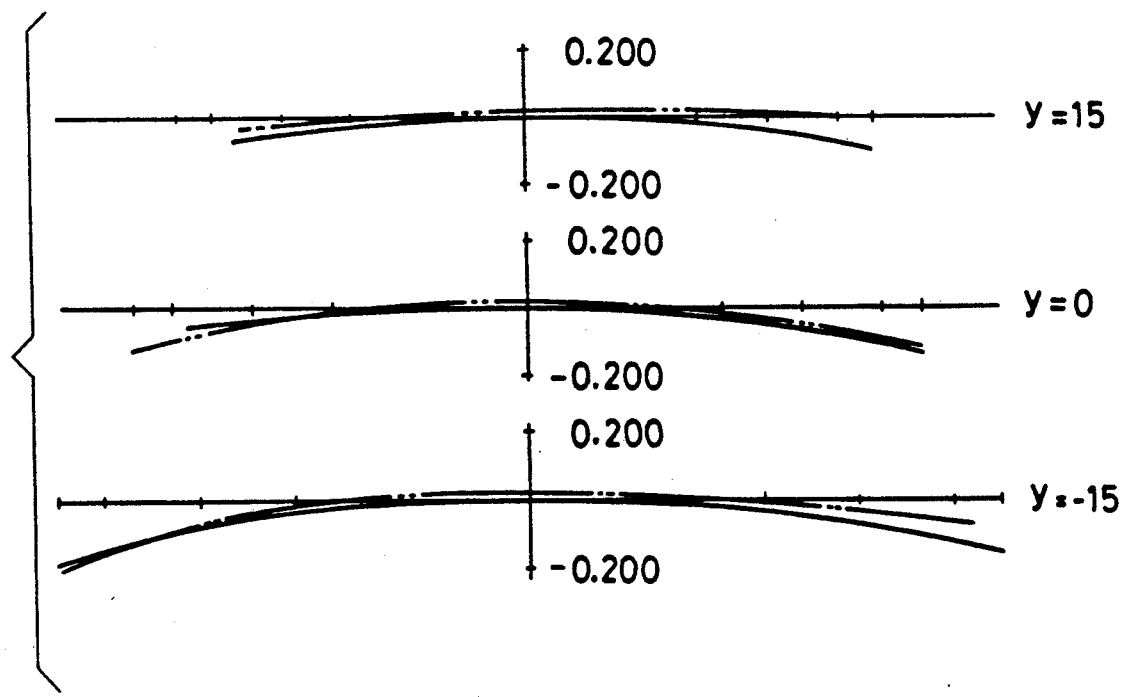
FIG. 6 shows lateral aberration curves which are obtained in the embodiment of the present invention when a second lens group is moved so as to correct an image blurring of 0.7 mm on an image surface.
Figure 5:
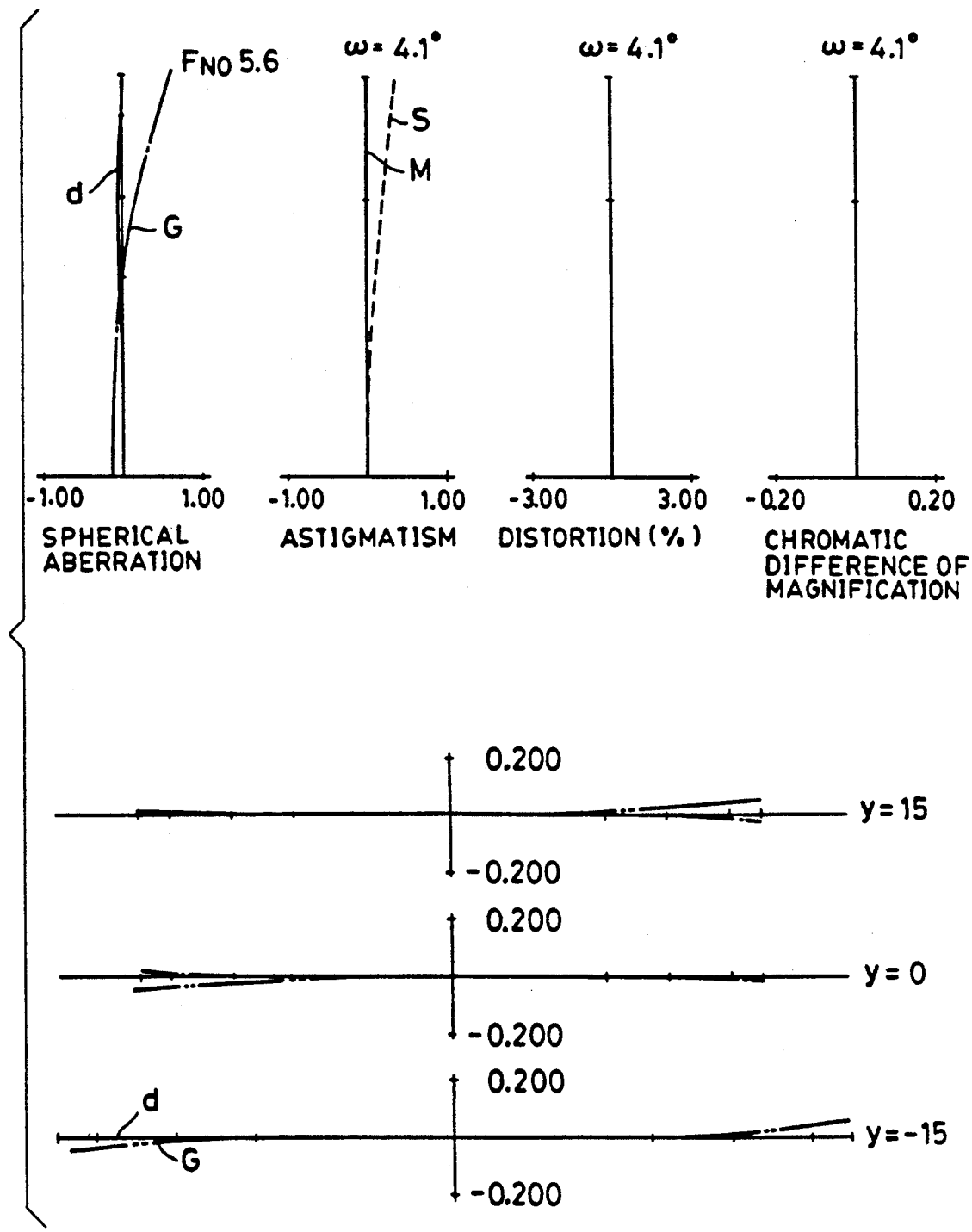
Figure 7A:
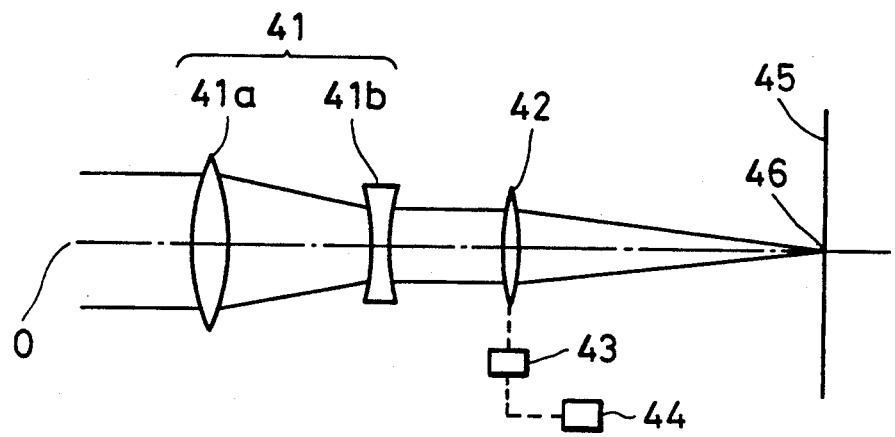
FIGS. 7(A), 7(B), and 7(C) are schematic views of a prior art photographic optical system that has a vibration-proof function.
Figure 7B:
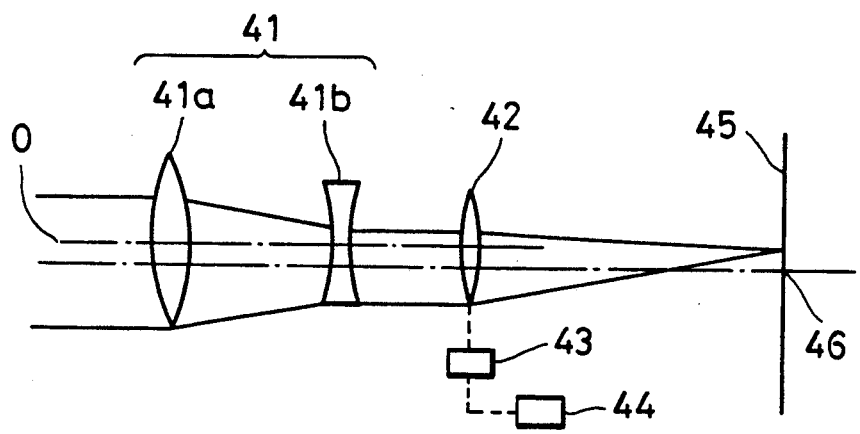
Figure 7C:
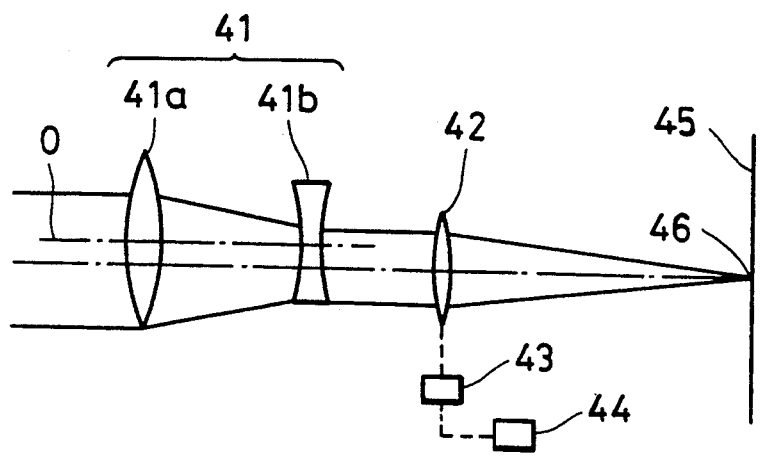

FIGS. 1 and 2 are cross-sectional views of lens systems which are employed in Numerical Examples of the present invention, which will be described later.

The lens system comprises a first lens group I having a positive refractive power, and a second lens group II having a positive refractive power. The first lens group I further comprises a fixed lens sub-group Ia, and a lens sub-group Ib which is moved along an optical axis 0 when the lens system is focused. In this embodiment, the second lens group II is a movable lens group which is to be decentered or deflected in, for example, a direction that is perpendicular to the optical axis in order to correct blurring of an image. The lens system also includes an acceleration sensor 1 for sensing blurring in the image, and a driving means 2 for driving the movable lens group in a direction in which the blurring of the image is cancelled on the basis of an output of the sensor.

In this embodiment, both the first and the second lens groups have a positive refractive power, and respectively contain at least one positive lens and at least one negative lens. The lens system of this embodiment is arranged such that it fulfills the following condition:

$$1 < f1/F < 3.5 \quad (1)$$

where f1 is a focal length of the first lens group, and F is a focal length of the overall system. The lens system is also arranged such that the second lens group thereof is a movable lens group for correcting blurring of an image. In consequence, blurring of images can be excellently corrected, and degrees of various aberrations caused by decentering the second lens group, such as coma aberration, astigmatism, curvature of image, can be reduced so that reduction of the optical performance is prevented.

Next, the second lens group, i.e., the movable lens group, in the refractive power arrangement of the embodiment is moved in a direction that is perpendicular to an optical axis so as to correct blurring of images. The aberration thus generated will be described in terms of a theory of lens aberrations that is based on a method illustrated by Matsui at the 23th Applied Physics Lecture Meeting held in 1962.

The aberration $\Delta'Y$ of the overall system generated by causing part of the lens groups of the photographic system to be parallel-decentered from an optical axis by E is the sum of the aberration $\Delta Y$ present before decentering occurs and the aberration $\Delta Y(E)$ generated by decentering, as expressed in the Equation (a), as follows:

$$\Delta'Y = \Delta Y + \Delta Y(E) \quad (a)$$

The aberration $\Delta Y(E)$ generated by decentering the second lens group then is expressed by an Equation (b), with reference to the first-order comatic aberration (IIE), the first-order astigmatism (IIIE), the first-order curvature of image (PE), the first-order distortion (VE1), the first-order additional distortion (VE2), which are caused by decentering, and the first-order movement of origin ($\Delta E$), as follows:

$$\Delta Y(E) = \frac{E}{2\alpha'_k} \Big\{ \big[ R^2 (2 + \cos 2\phi_R) (IIE) + \quad (b)$$
$$2R (N_1 \tan\omega) [\{2\cos(\phi_R - \phi_W) + \cos(\phi_R + \phi_W)\} (IIIE) + \cos\phi_R \cos\phi_W (PE)] +$$
$$(N_1 \tan\omega)^2 \{(2 + \cos 2\phi_W)(VE1) + (VW2)\} \big] \Big\} - \frac{1}{2\alpha_k'} \{E(\Delta E)\}$$

The aberrations (IIE) to ($\Delta E$) in turn can respectively be represented by the Equations (c) to (h), as follows:

$$(IIE) = -\alpha_P II_p + \overline{\alpha_P} I_p \quad (c)$$
$$(IIIE) = -\alpha_P III_p + \overline{\alpha_P} II_p \quad (d)$$
$$(PE) = -\alpha_P P_p \quad (e)$$
$$(VE1) = -\alpha_P V_p + \overline{\alpha_P} III_p \quad (f)$$
$$(VE2) = -\overline{\alpha_P} P_p \quad (g)$$
$$(\Delta E) = -2(\alpha' hd P - \alpha_p) \quad (h)$$

where $\alpha_p$ and $\overline{\alpha_p}$ are respectively the angles at which a bundle of rays is incident on, and emanates from, the movable lens group which is parallel-decentered in a photographic lens system composed of a fixed lens group and a movable lens group, and $I_p$, $II_p$, $III_p$, $P_p$ and $V_p$ are coefficients of aberrations of the movable lens group.

It is clear from the above Equations that degrees of aberrations generated by decentering may be decreased by decreasing the coefficients of aberrations $I_p$, $II_p$, $III_p$, $P_p$ and $V_p$ of the movable lens group or by setting aberrations IIE to VE2 such that they are cancelled with each other, as shown in Equations (b) to (h).

In this embodiment of the lens system, the coefficients of aberrations $I_p$, $II_p$, $III_p$, and $V_p$ are set such that $I_p$ and $II_P$, $III_p$ and $II_p$, and $V_p$ and $III_p$ are respectively cancelled by each other, and $P_p$ also is made as small as possible.

More specifically, in this embodiment, the second lens group, which is the movable lens group, is constructed such that it contains at least one positive lens and at least one negative lens so as to allow degrees of aberrations generated by decentering of the second lens group to be reduced.

Furthermore, in this embodiment, both the first and second lens groups comprise a lens group having a positive refractive power, so that the individual refractive powers of the first and second lens groups, which constitute a predetermined overall refractive power, can be made low. In this way, the number of lenses in the first and second lens groups, which are respectively associated with correction of aberrations generated in standard and decentered states, can be reduced. Furthermore, the mechanism of driving the second lens group for decentering can be made simple.

In particular, the refractive power of the first lens group in the embodiment is set such that it satisfies the previously defined condition (1). In consequence, the bundle of rays emanating from the first lens group can be adequately converged, thus allowing the number of and the diameter of lenses in the second lens group to be reduced.

The lower limit of condition (1) is determined by the fact that both the first and second lens groups have a positive refractive power. The upper limit of condition (1) is determined such that the first lens group does not come close to being an afocal system, so as to allow a predetermined refractive power to be maintained.

Next, structural features of the embodiment of the present invention will be described.

Firstly, in order to adequately correct aberrations mainly generated by decentering the second lens group, the embodiment of this invention also satisfies the following condition:

$$0.5 < f2/F < 10 \qquad (2)$$

where f2 is a focal length of the second lens group. If the refractive power of the second lens group is higher than the lower limit of condition (2), the degree of spherical aberration generated in the second lens group will be high, and the degree of comatic aberration generated by decentering of the second lens group also will be high. Hence, it is difficult to correct these aberrations in a balanced state. If the refractive power of the second lens group is lower than the condition 2 upper limit, the distance of movement, or sensitivity, of images will be small, thus increasing the amount second lens group driving which is required to correct blurring of a predetermined image.

Secondly, the embodiment also satisfies the following condition, in order to adequately correct astigmatism and comatic aberration generated by decentering of the second lens group:

$$|R \, II \, 1/R \, II \, K| < 2 \qquad (3)$$

where R II 1 and R II K are a radius of curvature of the surface of a first lens in the second lens group which is disposed closest to an object and a radius of curvature of the surface of a final lens in the second lens group, respectively.

If the radii of curvature exceed the lower limit of condition (3), the degree of astigmatism caused by decentering will be high. If the radii of curvature exceed the upper limit, a degree of comatic aberration caused by decentering will be high.

Thirdly, the embodiment also satisfies the following conditions, in order to adequately correct various aberrations caused by decentering in a balanced state:

$$0.03 < |R \, II \, N/F| < 0.6 \qquad (4)$$

$$0.05 < |R \, II \, P/F| < 0.7 \qquad (5)$$

where R II P is the radius of curvature of the highest curvature in the curvatures of the surfaces of the positive lenses in the second lens group, and R II N is the radius of curvature of the highest curvature in the curvatures of the surfaces of the negative lenses in the second lens group.

If the radii of curvature are lower than the lower limit of conditions (4) and (5), the possibility of generating high-order aberrations will be high. In particular, a degree of high-order comatic aberration generated by decentering will be high in the positive lens. In the negative lens, a degree of high-order distortion generated by decentering will be high. If the radius of curvature is higher than the upper limit of condition (4), comatic aberration generated in a standard state will be corrected insufficiently. If the radius of curvature is higher than the upper limit of condition (5), spherical aberration generated in a standard state will be corrected insufficiently.

Fourthly, the embodiment also satisfies the following condition.

$$D/F < 0.43 \qquad (6)$$

where D is the distance between the surface of the first lens and the surface of the final lens in the first lens group. If condition (6) is not satisfied, the overall length of the first lens group becomes too long, thus causing astigmatism generated in a standard state to be corrected insufficiently.

The present invention can also be applied to an automatic tracking system which automatically tracks an object by sensing the movement of the object and by decentering part of the lens system in accordance with the movement sensed.

The present invention can also be applied to an auto framing application because, in the photographic system according to the present invention, framing can be changed by decentering part of the lens system.

In the above-description, blurring of the image is shown to be corrected by causing the movable lens group to be parallel-decentered. However, the movable lens group may also be decentered rotatably, so as to obtain a predetermined optical performance.

Next, the embodiment of the present invention will be respectively described, by numerical examples 1 and 2. A reference symbol Ri denotes a radius of curvature of the surface of an ith lens, with the lens disposed closest to the object being the 1st, a reference symbol Di denotes the thickness or the air space of the ith lens, and reference symbols Ni and Vi respectively designate the refractive power and the Abbe number of the glass which constitutes the ith lens.

Table 1 lists the coefficients of third-order aberrations of the second lens group, and Table 2 shows the relation between the aforementioned conditions (1) through (6) and various values in the numerical example.

| Example 1 | | | |
|---|---|---|---|
| F = 296.8 | FNo = 1:5.6 | 2ω = 8.2° | |
| R1 = 118.06 | D1 = 4.00 | N1 = 1.62041 | ν1 = 60.3 |
| R2 = 380.57 | D2 = 1.61 | | |
| R3 = 78.18 | D3 = 8.00 | N2 = 1.65844 | ν2 = 50.9 |
| R4 = −209.17 | D4 = 1.27 | | |
| R5 = −190.01 | D5 = 2.00 | N3 = 1.64769 | ν3 = 33.8 |
| R6 = 89.08 | D6 = 81.43 | | |
| R7 = 179.05 | D7 = 4.00 | N4 = 1.62588 | ν4 = 35.7 |
| R8 = −48.83 | D8 = 0.30 | | |
| R9 = −50.53 | D9 = 2.00 | N5 = 1.77250 | ν5 = 49.6 |
| R10 = 71.80 | D10 = 10.00 | | |
| R11 = 85.58 | D11 = 3.00 | N6 = 1.75700 | ν6 = 47.8 |
| R12 = 711.59 | D12 = 1.54 | | |
| R13 = −52.70 | D13 = 2.00 | N7 = 1.66998 | ν7 = 39.3 |
| R14 = −703.31 | D14 = 12.85 | | |
| R15 = 3285.53 | D15 = 3.50 | N8 = 1.69680 | ν8 = 55.5 |
| R16 = −80.62 | | | |
| Example 2 | | | |
| F = 300 | FNo = 1:5.6 | 2ω = 8.2° | |
| R1 = 95.01 | D1 = 2.94 | N1 = 1.72016 | ν1 = 54.7 |
| R2 = 241.59 | D2 = 0.03 | | |
| R3 = 98.91 | D3 = 5.39 | N2 = 1.65844 | ν2 = 50.9 |
| R4 = −185.58 | D4 = 0.00 | | |
| R5 = −191.57 | D5 = 1.93 | N3 = 1.72047 | ν3 = 34.7 |
| R6 = 117.94 | D6 = 83.85 | | |
| R7 = 222.20 | D7 = 3.55 | N4 = 1.53256 | ν4 = 45.9 |
| R8 = −94.51 | D8 = 0.33 | | |
| R9 = −119.34 | D9 = 2.00 | N5 = 1.75500 | ν5 = 52.3 |
| R10 = 67.57 | D10 = 17.50 | | |
| R11 = −31.38 | D11 = 1.78 | N6 = 1.58267 | ν6 = 46.4 |
| R12 = −37.47 | D12 = 0.01 | | |

-continued

| | | | |
|---|---|---|---|
| R13 = 115.87 | D13 = 3.01 | N7 = 1.75700 | v7 = 47.8 |
| R14 = −591.88 | | | |

TABLE 1

| | $I_p$ | $II_p$ | $III_p$ | $P_p$ | $V_p$ |
|---|---|---|---|---|---|
| Example 1 | −2.70615 | −0.96250 | 0.82800 | 0.77329 | 5.99366 |
| Example 2 | −5.57785 | −1.21193 | 1.87591 | 0.76187 | 4.40486 |

TABLE 2

| | Conditional Expression | | | | | |
|---|---|---|---|---|---|---|
| | (1) $f1/F$ | (2) $f2/F$ | (3) R II 1/ R II K | (4) R II N/ F | (5) R II P/ F | (6) D/F |
| Example 1 | 2.08 | 0.61 | 1.06 | 0.27 | 0.29 | 0.38 |
| Example 2 | 3.33 | 0.63 | 0.053 | 0.10 | 0.39 | 0.41 |

As will be understood from the foregoing description, in the present invention, both the first and second lens group have a positive refractive power. The first and second lens group respectively contain at least one positive lens and at least one negative lens. The second lens group is a movable lens group moved for correcting blurring of images. Consequently, the number of lenses in the movable lens group can be decreased, and the movable lens group can be thus made small and light-weight, thereby allowing the load of an actuator to be reduced and also to achieve a quick response. Furthermore, the configuration of the movable lens group is specified in the manner described above so as to decrease degrees of aberrations generated by moving the movable lens group, including comatic aberration, astigmatism, and distortion. Thereby, there is obtained an excellent optical performance.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A photographic system for stabilizing an image, comprising:

a first lens group having a positive refractive power, said first lens group containing at least one positive lens and at least one negative lens;

a second lens group disposed on an image side of said first lens group, said second lens group having a positive refractive power and containing at least one positive lens and one negative lens, said first and second lens group determining a reference optical axis;

a sensor; and means to decenter said second lens group in a direction having a component perpendicular to said reference optical axis on the basis of an output of said sensor, wherein said image stabilizing apparatus satisfies the following condition:

$$1 < f1/F < 3.5$$

where f1 is a focal length of said first lens group, and F is a focal length of the overall system.

2. A system for stabilizing an image according to claim 1, wherein said apparatus satisfies the following condition:

$$0.5 < f2/F < 10$$

where f2 is a focal length of said second lens group.

3. A system for stabilizing an image according to claim 2, wherein said apparatus satisfies the following condition:

$$|R\ II\ I/R\ II\ K| < 2$$

where R II 1 and R II K are a radius of curvature of the surface of a front lens in said second lens group which is disposed closest to an object and a radius of curvature of the surface of a rear lens in said second lens group, respectively.

4. A system for stabilizing an image according to claim 3, wherein said apparatus also satisfies the following conditions:

$$0.03 < |R\ II\ N/F| < 0.6$$

$$0.05 < |R\ II\ P/F| < 0.7$$

where R II P is the radius of curvature of the highest curvature in the curvatures of the surfaces of said positive lenses in said second lens group, and R II N is the radius of curvature of the highest curvature in the curvatures of the surfaces of said negative lenses in said second lens group.

5. A system for stabilizing an image according to claim 1, wherein said apparatus satisfies the following condition:

$$D/F < 0.43$$

where D is the distance between a first lens surface to a final lens surface in said first lens group.

* * * * *

UNITED STATES PATENT AND TRADEMARK OFFICE
CERTIFICATE OF CORRECTION

PATENT NO. : 5,018,845
DATED : May 28, 1991
INVENTOR(S) : SHOICHI YAMAZAKI

It is certified that error appears in the above-identified patent and that said Letters Patent is hereby corrected as shown below:

Column 1
  Line 41, "groups" should read --group--.

Column 2
  Line 25, "the" should be deleted.

Column 4
  Line 23, "$\Delta E = -2 \ (\alpha' hd \ P - \alpha_p)$"  ...(h)
should read --$\Delta E = -2 \ (\alpha'_p - \alpha_p)$  ...(h)--.

Column 5
  Line 24, "amount" should read --amount of--.

Column 8
  Line 1, "group" should read --groups--.

Signed and Sealed this

Twenty-second Day of December, 1992

Attest:

DOUGLAS B. COMER

Attesting Officer    Acting Commissioner of Patents and Trademarks